Feb. 16, 1932.  S. G. RUSSELL  1,844,980
FISHING REEL
Filed Sept. 28, 1929.
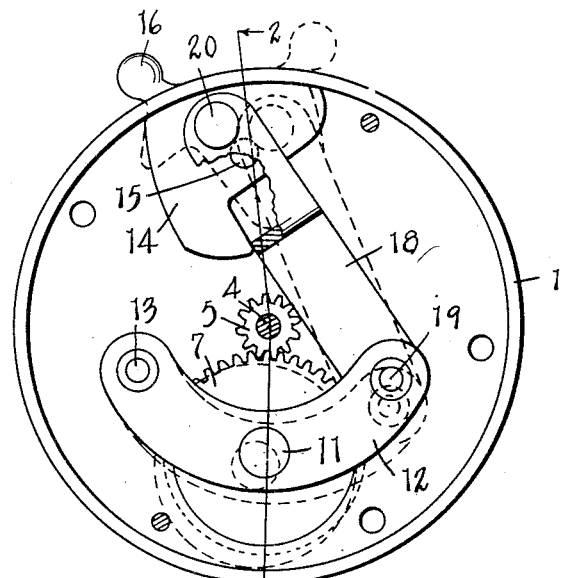
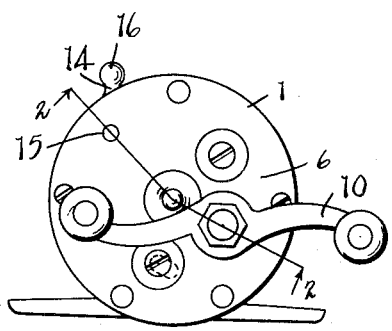
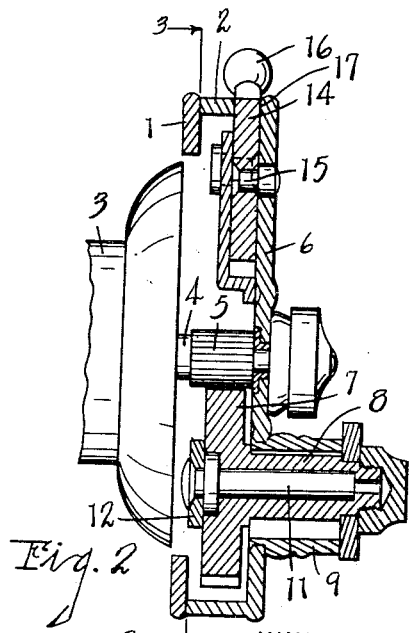
INVENTOR
Samuel G. Russell
BY Chappell & Earl
ATTORNEYS Patented Feb. 16, 1932

1,844,980

UNITED STATES PATENT OFFICE

SAMUEL G. RUSSELL, OF KALAMAZOO, MICHIGAN, ASSIGNOR TO SHAKESPEARE COMPANY, OF KALAMAZOO, MICHIGAN

FISHING REEL

Application filed September 28, 1929. Serial No. 396,301.

The main objects of this invention are to provide in a fishing reel an improved means for freeing the spool driving means which is economical in its parts, compact, easy to manipulate and at the same time strong and durable.

Objects relating to details and economies of my invention will appear from the description to follow. The invention is defined and pointed out in the claims.

A structure which is a preferred embodiment of my invention is illustrated in the accompanying drawings, in which:

Fig. 1 is an end view of my improved fishing reel.

Fig. 2 is a fragmentary view partially in section on a line corresponding to line 2—2 of Figs. 1 and 3.

Fig. 3 is a sectional view on a line corresponding to line 3—3 of Fig. 2.

In the embodiment illustrated, my improved reel comprises a frame designated generally by the numeral 1 having a chambered head 2. As the details of the frame form no part of this invention they are not illustrated herein.

The spool 3 is provided with a shaft 4 having a pinion 5 thereon. This shaft is journaled in the head plate 6.

The driving pinion 7 is provided with a hub 8 projecting through the collar 9 mounted upon the head plate, the interior diameter of the collar being such as to permit lateral motion of the hub 8 therein. A crank 10 is mounted on the outer end of the hub.

The driving gear 7 is mounted upon a spindle 11 carried by a curved spindle support 12. This support is disposed with its curve outwardly, being pivoted at 13 to the head plate.
By swinging this support on its pivot, the driving gear may be brought into mesh with the pinion or may be swung into a disengaging position as indicated by dotted lines in Fig. 3.

The actuating member 14 is in the form of a plate pivoted at 15 to the head plate 6 and provided with a spherical finger piece 16 projecting through the slot 17 in the periphery of the head. This actuating member is connected to the swinging end of the gear support 12 by means of the link 18 which is pivoted to the support at 19 and to the actuating member at 20.

It will be noted that the actuating member and the gear support are disposed on opposite sides of the pinion and that the link 18 and the pivot 13 for the support are also disposed on opposite sides of the pinion, the result being that a substantial movement or swing may be had for the support 12. The pivot connecting the link to the actuating member swings to opposite sides of the pivot of the actuating member so that the parts remain in adjusted position without the aid of springs or catches.

I have illustrated and described my improvements in a practical embodiment thereof. I have not attempted to illustrate or describe certain embodiments or adaptations contemplated by me as it is believed that this disclosure will enable those skilled in the art to embody or adapt my improvements as may be desired.

Having thus described my invention, what I claim as new and desire to secure by Letters Patent, is:

1. In a fishing reel, the combination with a frame provided with a chambered head, of a spool mounted within said frame and provided with a pinion disposed within said head, a driving gear provided with a hub projecting from said head, a crank on said hub, a spindle for said driving gear an outwardly curved support for said spindle pivoted at one end within said head to lie at one side of said pinion, an actuating member pivotally mounted within said head at the opposite side of said pinion and provided with a finger piece projecting through the periphery of the head, and a link connecting the swinging end of said spindle support with said actuating member, the pivot connection for the link to the actuating member being disposed so that it swings across the plane through the actuating member pivot and the pivot connecting the link to said support so that the gear may be shifted into and out of mesh with the pinion and is held in either position.

2. In a fishing reel, the combination with a frame provided with a chambered head, of a spool mounted within said frame and provided with a pinion disposed within said head, a driving gear provided with a crank, a spindle for said driving gear, a pivoted support for said spindle, an actuating member pivotally mounted within said head and projecting for operation therefrom, and a link connecting said spindle support with said actuating member, the pivot connection for the link to the actuating member being disposed so that it swings across the plane through the actuating member pivot and the pivot connecting the link to said support so that the gear may be shifted into and out of mesh with the pinion and is held in either position.

In witness whereof I have hereunto set my hand.

SAMUEL G. RUSSELL.